US011009773B2

United States Patent
Zhong et al.

(10) Patent No.: US 11,009,773 B2
(45) Date of Patent: May 18, 2021

(54) DUAL-CHIRPED SPECTRAL OPTICAL PARAMETRIC AMPLIFIER AND AMPLIFICATION METHOD

(71) Applicant: SHENZHEN UNIVERSITY, Shenzhen (CN)

(72) Inventors: Haizhe Zhong, Shenzhen (CN); Yuhai Liang, Shenzhen (CN); Dahua Dai, Shenzhen (CN); Ying Li, Shenzhen (CN); Dianyuan Fan, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 514 days.

(21) Appl. No.: 16/078,496

(22) PCT Filed: Aug. 11, 2017

(86) PCT No.: PCT/CN2017/097088
§ 371 (c)(1),
(2) Date: Aug. 21, 2018

(87) PCT Pub. No.: WO2019/028831
PCT Pub. Date: Feb. 14, 2019

(65) Prior Publication Data
US 2020/0241382 A1    Jul. 30, 2020

(51) Int. Cl.
*G02F 1/39* (2006.01)
*G02F 1/355* (2006.01)

(52) U.S. Cl.
CPC ............. *G02F 1/39* (2013.01); *G02F 1/3558* (2013.01)

(58) Field of Classification Search
CPC ......... G02F 1/3548; G02F 1/3558; G02F 1/39
See application file for complete search history.

(56) References Cited

U.S. PATENT DOCUMENTS 6,181,463 B1    1/2001  Galvanauskas et al.
8,542,435 B2 *  9/2013  Raybaut ................ G02F 1/3544
                                                  359/330
(Continued)

FOREIGN PATENT DOCUMENTS

CN    102016707    4/2011
CN    106329302    1/2017
(Continued)

OTHER PUBLICATIONS

Fu et al., "High-energy infrared femtosecond pulses generated by dual-chirped optical parametric amplification", Optics Letters vol. 40, No. 21, 5082, four pages, Nov. 1, 2015 (Year: 2015).*

(Continued)

*Primary Examiner* — Daniel Petkovsek (57) ABSTRACT

The present invention belongs to the technical field of lasers and provides a dual-chirped spectral optical parametric amplifier and an amplification method. A femtosecond laser assembly is configured to generate simultaneous pump and signal waves which successively pass through an input grating and an input collimator respectively. The various spectrum components of both the pump and the signal waves linearly disperse and focus on respective focal points, and present spatial chirps with opposite frequency gradients in the respective focal planes. A full-spectrum optical parametric amplification of the signal wave with the pump wave is performed via a fan-out periodically poled crystal, resulting an ultrabroad idler wave. The ultrabroad idler wave is separated from the hybrid waves via an optical splitter, and then passes successively through an output collimator and an output grating, and is Fourier transformed from frequency domain to temporal domain. An ultra-short pulsed laser with a long wavelength can be obtained eventually after a necessary dispersion compensation. The present invention pro- (Continued)

vides a simple-structured optical parametric amplifier so as to obtain an ultra-short pulsed laser with a long wavelength.

10 Claims, 4 Drawing Sheets

(56) References Cited

U.S. PATENT DOCUMENTS

| | | | | |
|---|---|---|---|---|
| 9,203,207 | B2* | 12/2015 | Qian | .................. H01S 3/10084 |
| 10,042,232 | B2* | 8/2018 | Beutler | ................. G02F 1/3544 |
| 10,234,744 | B2* | 3/2019 | Zhong | .................. G02F 1/3551 |
| 2011/0043895 | A1 | 2/2011 | Hikmet | |

FOREIGN PATENT DOCUMENTS

| | | |
|---|---|---|
| CN | 106785848 | 5/2017 |
| CN | 106911056 | 6/2017 |
| CN | 107247380 | 10/2017 |
| EP | 2283393 | 2/2011 |
| JP | 2011520149 | 7/2011 |
| WO | 2009136321 | 11/2009 |

OTHER PUBLICATIONS

International Search Report dated May 2, 2018 for corresponding International Application No. PCT/CN2017/097088, filed Aug. 11, 2017.

* cited by examiner

DUAL-CHIRPED SPECTRAL OPTICAL PARAMETRIC AMPLIFIER AND AMPLIFICATION METHOD

CROSS-REFERENCE TO RELATED APPLICATION

This Application is a Section 371 National Stage Application of International Application No. PCT/CN2017/097088, filed Aug. 11, 2017.

TECHNICAL FIELD

The present invention belongs to the technical field of lasers, and particularly relates to a dual-chirped spectral optical parametric amplifier and an amplification method.

BACKGROUND

An ultra-short pulsed laser of a long wavelength and few optical cycles has significant applications in physics, chemistry, biology, optoelectronics, laser spectroscopy, etc. and is an important tool in launching micro-scale scientific research and revealing ultrafast physical and chemical processes.

At present, a frequency down-conversion based on second-order optical nonlinear effect is an effective way to generate the ultra-short pulsed laser of a long wavelength. To obtain a high-intensity ultra-short pulsed laser, there are normally two essential conditions: a broadband driving pump laser and a subsequent multi-stage difference frequency generator or optical parametric amplifier, wherein spectral bandwidth of the driving pump laser determines that of an initial seeding wave while gain bandwidth of the difference frequency generator or optical parametric amplifier is a key factor of whether the seeding wave can be amplified effectively without a frequency-spectrum loss. Generally speaking, a combination of the broadband driving pump laser and an optical parametric chirp pulse amplifier (OPCPA) offering an ultrabroad gain spectrum is currently a conventional technique to achieve the high-intensity ultra-short pulsed laser.

Basic working principal of the optical parametric amplifier (OPA) is to amplify a signal wave at a frequency of $\omega$s is with help of a pump wave at a frequency of $\omega$p and an appropriate nonlinear crystal, which serving as an energy provider and an energy conversion medium respectively. In a meantime, a third laser beam termed as an idler wave with a frequency of $\omega$i is obtained ($\omega p > \omega s$, $\omega p = \omega s + \omega i$). In conventional femtosecond optical parametric amplifiers, the pump and the signal waves are both femtosecond pulsed lasers of Fourier-transform limit wherein group velocity mismatch (GVM) between these interacting waves limits effective interaction length in the nonlinear crystal and therefore results in a low energy conversion efficiency. Although the lack of effective interaction length can be alleviated by increasing pump intensity, peak power of the pump wave is limited by damage threshold of the nonlinear crystal and as a result, high-intensity ultra-short pulsed lasers still cannot be efficiently achieved. To solve this problem, optical parametric chirp pulse amplifier is put forward. Through temporally stretching the broadband signal wave, the influence of GVM can be avoided with a premise of no damage to the nonlinear crystal when an energetic picosecond or nanosecond pulsed laser serves as the pump wave. Nevertheless, due to material dispersion, broadband phase-matching based on a single-stage optical parametric amplifier can still hardly be realized, resulting in frequency components of off-center wavelength cannot be fully amplified, and a limited spectral bandwidth of the extracted ultra-short pulsed laser.

SUMMARY

Technical Problem

The present invention provides a dual-chirped spectral optical parametric amplifier and an amplification method, aiming at offering an optical parametric amplifier capable of generating and amplifying an ultra-short pulsed laser with a long wavelength. It can get rid of the restriction of crystal damage and group velocity mismatch in conventional femtosecond optical parametric amplifiers. Also, it can solve the problem that due to incapability of single-stage broadband optical parametric amplification, the ultra-short pulsed laser with a long wavelength cannot be achieved in conventional optical parametric chirp pulse amplifiers.

Technical Solution

The present invention provides a dual-chirped spectral optical parametric amplifier, comprising a femtosecond laser assembly, a first input grating, a second input grating, a first input collimator, a second input collimator, an optical coupler, a fan-out periodically poled crystal, an optical splitter, an output collimator and an output grating, wherein the fan-out periodically poled crystal, the optical splitter, the output collimator and the output grating are arranged sequentially in the direction of an optical path.

The femtosecond laser assembly is configured to generate two synchronous femtosecond pulsed lasers, comprising a pump wave and a signal wave; the pump wave passes successively through the first input grating and the first input collimator, then enters the optical coupler; the signal wave passes successively through the second input grating and the second input collimator, then enters the optical coupler; the incident pump and signal waves are spatially coupled via the optical coupler; the various spectrum components of both the pump and the signal waves linearly disperse and focus on respective focal points, and present spatial chirps with opposite frequency gradients in the respective focal planes in which the focal points are respectively located.

The pump and the signal waves outgoing from the optical coupler enter the fan-out periodically poled crystal, wherein the fan-out periodically poled crystal serves as a nonlinear medium, to perform a full-spectrum optical parametric amplification of the signal wave with the pump wave, resulting an amplified signal wave and an attenuated pump wave and also an ultrabroad idler wave; the ultrabroad idler wave is separated from the amplified signal wave and the attenuated pump wave via the optical splitter; the separated idler wave passes successively through the output collimator and the output grating, and is Fourier transformed from frequency domain to temporal domain, to obtain an ultra-short pulsed laser with a long wavelength.

Wherein phase-matching grating periods required for each independent spectrum components of the pump and the signal waves just correspond to those of the fan-out periodically poled crystal, such that all spectrum components across the entire spectrum can satisfy the phase-matching condition.

Preferably, the femtosecond laser assembly comprises a first femtosecond laser and a second femtosecond laser, and the pump wave outgoing from the first femtosecond laser and the signal wave outgoing from the second femtosecond laser are synchronous; or alternatively, the femtosecond laser assembly comprises a femtosecond laser and a frequency converter, and a femtosecond pulsed laser outgoing from the femtosecond laser passes through the frequency converter to generate two synchronous femtosecond pulsed lasers, one of which acting as the pump wave and the other of which acting as the signal wave.

Preferably, the first femtosecond laser is a 790 nm Ti:Sapphire femtosecond laser which outputs a 790 nm pump wave, and the second femtosecond laser is a 1030 nm femtosecond laser, which outputs a 1030 nm signal wave.

Preferably, the dual-chirped spectral optical parametric amplifier further comprises a dispersion compensator, wherein the dispersion compensator is arranged between the output grating and an output terminal of the dual-chirped spectral optical parametric amplifier, to compensate for accumulated group velocity dispersion of the idler wave outgoing from the output grating.

Preferably, the optical splitter is a dichroic mirror with high transmittance to the signal and the pump waves and with high reflectivity to the idler wave; or alternatively, the optical splitter is a dichroic mirror with high transmittance to the idler wave and with high reflectivity to the signal and the pump waves.

The present invention further provides a dual-chirped spectral optical parametric amplification method, comprising:

generating two synchronous femtosecond pulsed lasers comprising a pump wave and a signal wave, by a femtosecond laser assembly;

transmitting the pump and the signal waves respectively through an input grating, an input collimator and an optical coupler, such that the various spectrum components of both the pump and the signal waves linearly disperse and focus on the respective focal points, and present spatial chirps with opposite frequency gradients in the respective focal planes in which the focal points are respectively located;

performing a full-spectrum optical parametric amplification of the signal wave with the pump wave via a fan-out periodically poled crystal, resulting an amplified signal wave and an attenuated pump wave and also an ultrabroad idler wave;

separating the ultrabroad idler wave from the amplified signal wave and the attenuated pump wave; and transmitting the ultrabroad idler wave successively through an output collimator and an output grating, and performing a Fourier transform from frequency domain to temporal domain, to obtain an ultra-short pulsed laser with a long wavelength.

Preferably, phase-matching grating periods required for each independent spectrum components of the pump and the signal waves just correspond to those of the fan-out periodically poled crystal, such that all spectrum components across the entire spectrum can satisfy the phase-matching condition.

Preferably, the femtosecond laser assembly comprises a first femtosecond laser and a second femtosecond laser, and the pump wave outgoing from the first femtosecond laser and the signal wave outgoing from the second femtosecond laser are synchronous; or alternatively, the femtosecond laser assembly comprises a femtosecond laser and a frequency converter, and a femtosecond pulsed laser outgoing from the femtosecond laser passes through the frequency converter to generate two synchronous femtosecond pulsed lasers, one of which acting as the pump wave and the other of which acting as the signal wave.

Preferably, the first femtosecond laser is a 790 nm Ti:Sapphire femtosecond laser which outputs a 790 nm pump wave; and the second femtosecond laser is a 1030 nm femtosecond laser which outputs a 1030 nm signal wave.

Preferably, transmitting the ultrabroad idler wave successively through an output collimator and an output grating, and performing a Fourier transform from frequency domain to temporal domain, to obtain an ultra-short pulsed laser with a long wavelength comprising:

transmitting the ultrabroad idler wave successively through an output collimator and an output grating, and performing a Fourier transform from frequency domain to temporal domain, and compensating for accumulated group velocity dispersion of the idler wave outgoing from the output grating, to obtain an ultra-short pulsed laser with a long wavelength.

Advantageous Effects

Compared with prior art, the present invention has the following beneficial effects: the present invention provides a dual-chirped spectral optical parametric amplifier and an amplification method. A femtosecond laser assembly is configured to generate simultaneous pump and signal waves which successively pass through an input grating and an input collimator, respectively. The various spectrum components of both the pump and the signal waves linearly disperse and focus on respective focal points, and present spatial chirps with opposite frequency gradients in the respective focal planes in which the focal points are respectively located. The pump and the signal waves outgoing from the optical coupler enter the fan-out periodically poled crystal, wherein the fan-out periodically poled crystal serves as a nonlinear medium, to perform a full-spectrum optical parametric amplification of the signal wave with the pump wave, resulting an ultrabroad idler wave. The ultrabroad idler wave is separated from the amplified signal wave and the attenuated pump wave via the optical splitter, and then passes successively through the output collimator and the output grating, and is Fourier transformed from frequency domain to temporal domain, to obtain an ultra-short pulsed laser with a long wavelength. Compared with a conventional optical parametric amplifier, by means of the added opposite spatial chirps to pump and signal waves, spectral bandwidth of the generated idler wave can be increased greatly. Besides, since various spectrum components of the pump and the signal waves linearly diverse on a focus plane, their pulse durations thus can be broadened proportionally so that limitations of crystal damage and group velocity mismatch of conventional femtosecond optical parametric amplifiers can be relaxed. Via appropriately designing grating periods of the fan-out periodically poled crystal which vary along frequency variation direction of the signal and pump waves, phase-matching grating periods required for their relatively independent spectrum components can just correspond to those of the fan-out periodically poled crystal, such that all spectrum components across the entire spectrum can satisfy the phase-matching condition. A highly efficient full-spectrum optical parametric amplification can be fulfilled eventually. By means of a high-power pump source, the present invention is able to obtain a high-intensity ultra-short pulsed laser with a long wavelength directly.

DESCRIPTION OF THE EMBODIMENTS

In order to make objectives, technical solutions and advantages of the present invention more comprehensible, the present invention will be further described in detail below with reference to accompanying drawings and embodiments. It should be understood that specific embodiments described herein are merely used to explain the present invention and are not intended to limit the present invention.

There exists a problem that broadband ultra-short pulsed lasers cannot be achieved directly due to restrictions of crystal damage and group velocity mismatch in conventional femtosecond optical parametric amplifiers and incapability of single-stage broadband optical parametric amplification in conventional optical parametric chirp pulse amplifiers.

To solve the above technical problem, the present invention provides a dual-chirped spectral optical parametric amplifier and an amplification method, theoretical basis and derivation process of technical solutions provided by the present invention will be introduced specifically as below.

The theory therein is not complicated: various spectrum components of signal and pump waves are linearly distributed in space rather than in temporal, assuming that instantaneous angular frequency of spatial-chirped pump, signal and idler waves are ωp(x), ωs(x) and ωi(x) respectively. Firstly, energy conservation should be obeyed, that is:

$$\omega i(x)=\omega p(x)-\omega s(x) \quad (1)$$

For the spatial-chirped pump and signal waves, the instantaneous angular frequency can be respectively represented as:

$$\omega p(x)=\omega p0+\beta p \cdot x \quad (2)$$

$$\omega s(x)=\omega s0+\beta s \cdot x \quad (3)$$

wherein ωp0 and ωs0 respectively present central angular frequency of the pump and the signal waves, and βp=dωp(x)/dx and βs=dωs(x)/dx respectively present linear spatial chirps of the pump and the signal waves. Substituting Eqs. (2) and (3) into Eq. (1), then we can get:

$$\omega i(x)=(\omega p0-\omega s0)+(\beta p-\beta s) \cdot x \quad (4)$$

It is plain to see that the linear spatial chirps of the pump and the signal waves (i.e., βp and βs) determine not only "positive" or "negative" of the linear spatial chirp but also the initial spectral bandwidth of the generated idler wave. Supposing chirp signs of the pump and the signal waves are opposite, theoretically, the idler wave, which is a by-product of optical parametric amplification, will have a remarkably broadened initial spectrum compared with those of incident pump and signal waves. For example, if the spectral bandwidth of the pump and the signal waves are equal, that of the generated idler wave will be doubled.

An initial seeding wave with an enough broadband spectrum is a prerequisite to obtain a high-intensity ultra-short idler wave. Nevertheless, phase-matching bandwidth of optical parametric amplification determines the available shortest pulse duration. Owing to material dispersion, it is still difficult to realize ultrabroad phase-matching based on a single nonlinear crystal under that operation condition of opposite dual chirps.

Therefore, a fan-out periodically poled crystals is adopted as the nonlinear crystal and arranged on a focus plane. Via appropriately designing grating periods of the fan-out periodically poled crystal which vary along frequency variation direction of the signal and pump waves, phase-matching grating periods required for their relatively independent spectrum components can just correspond to those of the fan-out periodically poled crystal, such that all spectrum components across the entire spectrum can satisfy the phase-matching condition. A highly efficient optical parametric amplification can be fulfilled eventually.

The dual-chirped spectral optical parametric amplifier provided by the present invention will be introduced specifically as below, which comprising: a femtosecond laser assembly, a first input grating, a second input grating, a first input collimator, a second input collimator, an optical coupler, a fan-out periodically poled crystal, an optical splitter, an output collimator, an output grating and a dispersion compensator, wherein the fan-out periodically poled crystal, the optical splitter, the output collimator, the output grating and the dispersion compensator are arranged sequentially in the direction of an optical path.

The femtosecond laser assembly is configured to generate two synchronous femtosecond pulsed lasers, comprising a pump wave and a signal wave, wherein the pump wave passes successively through the first input grating and the first input collimator, then enters the optical coupler, and the signal wave passes successively through the second input grating and the second input collimator, then enters the optical coupler. The pump and the signal waves are spatially coupled via the optical coupler, and various spectrum components of both the pump and the signal waves linearly disperse and focus on respective focal points, and present spatial chirps with opposite frequency gradients in the respective focal planes (i.e., the Fourier plane) in which the focal points are respectively located. The pump and the signal waves outgoing from the optical coupler enter the fan-out periodically poled crystal, wherein the fan-out periodically poled crystal serves as a nonlinear medium, to perform a full-spectrum optical parametric amplification of the signal wave with the pump wave, resulting an amplified signal wave and an attenuated pump wave and also an ultrabroad idler wave. The ultrabroad idler wave is separated from the amplified signal wave and the attenuated pump wave via the optical splitter, and then passes successively through the output collimator and the output grating, and is Fourier transformed from frequency domain to temporal domain. The dispersion compensator is arranged between the output grating and an output terminal of the dual-chirped spectral optical parametric amplifier, to compensate for accumulated group velocity dispersion of the idler wave outgoing from the output grating, to obtain an ultra-short pulsed laser with a long wavelength.

Specifically, the fan-out periodically poled crystals provided by the present invention is arranged on the focus plane, which serving as an energy conversion medium. Via appropriately designing grating periods of the fan-out periodically poled crystal which vary along frequency variation direction of the signal and pump waves, required phase-matching grating periods for their relatively independent spectrum components can just correspond to those of the fan-out periodically poled crystal, such that each of the spectrum components satisfies the phase-matching condition. A highly efficient full-spectrum optical parametric amplification can be fulfilled and a broadband idler wave can be obtained eventually.

Specifically, the femtosecond laser assembly comprises a first femtosecond laser and a second femtosecond laser, and the pump wave outgoing from the first femtosecond laser and the signal wave outgoing from the second femtosecond laser are synchronous; or alternatively, the femtosecond laser assembly comprises a femtosecond laser and a frequency converter, and a femtosecond pulsed laser outgoing from the femtosecond laser passes through the frequency converter to generate two synchronous femtosecond pulsed lasers, one of which acting as the pump wave and the other of which acting as the signal wave.

Specifically, the first input grating, the second input grating and the output grating are respectively applicable to the pump, the signal and the idler waves.

Specifically, the optical splitter is a dichroic mirror with high transmittance to the signal and the pump waves and with high reflectivity to the idler wave; or alternatively, the optical splitter is a dichroic mirror with high transmittance to the idler wave and with high reflectivity to the signal and the pump waves. Whether dichroic mirror it is, the aim is to separate the ultrabroad idler wave from the amplified signal wave and the attenuated pump wave so that the separated idler wave can be further optimized.

The dual-chirped spectral optical parametric amplifier provided by the present invention, by means of the added opposite spatial chirps to pump and signal waves, spectral bandwidth of the generated idler wave can be increased greatly. Besides, since the various spectrum components of the pump and the signal waves linearly diverse on a focus plane, their pulse durations thus can be broadened proportionally so that the limitation of crystal damage and group velocity mismatch of conventional femtosecond optical parametric amplifiers can be relaxed. Via appropriately designing grating periods of the fan-out periodically poled crystal which vary along frequency variation direction of the signal and pump waves, phase-matching grating periods required for their relatively independent spectrum components can just correspond to those of the fan-out periodically poled crystal, such that all spectrum components across the entire spectrum can satisfy the phase-matching condition. A highly efficient full-spectrum optical parametric amplification can be fulfilled eventually. By means of a high-power pump source, the present invention is able to obtain a high-intensity ultra-short pulsed laser with a long wavelength directly, which simplifies the complexity of high-intensity laser systems extremely. Theoretically, a mid-infrared pulsed laser of few optical cycles can be achieved only if a 100-fs commercial near-infrared pulsed laser is configured.

Figure 1:
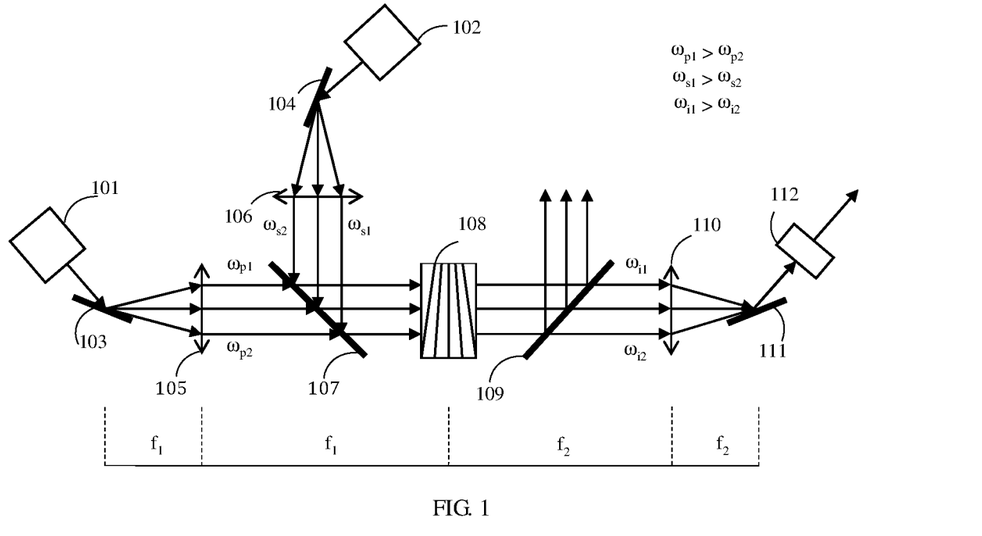
FIG. 1 is a schematic view showing an optical path of a dual-chirped spectral optical parametric amplifier according to an embodiment of the present invention.

As a specific embodiment of the present invention, as shown in FIG. 1, the present invention provides a dual-chirped spectral optical parametric amplifier, comprising: a first near-infrared femtosecond laser 101, a second near-infrared femtosecond laser 102, a first input grating 103, a second input grating 104, a first input collimator 105, a second input collimator 106, an optical coupler 107, a periodically poled crystal 108, an optical splitter 109, an output collimator 110, an output grating 111 and a dispersion compensator 112.

Wherein, the first near-infrared femtosecond laser 101 and the second near-infrared femtosecond laser are synchronous; the first near-infrared femtosecond laser 101 is a 790 nm Ti:Sapphire femtosecond laser, and the 790 nm femtosecond pulsed laser outgoing from the first near-infrared femtosecond laser serves as the pump wave of the dual-chirped spectral optical parametric amplifier; the second near-infrared femtosecond laser 102 is a 1030 nm femtosecond laser, and the 1030 nm femtosecond pulsed laser outgoing from the second near-infrared femtosecond laser serves as the signal wave of the dual-chirped spectral optical parametric amplifier.

Wherein the pump wave passes successively through the first input grating 103 and the first input collimator 105, then enters the optical coupler 107; and the signal wave passes successively through the second input grating 104 and the second input collimator 106, then enters the optical coupler 107, so that the chirp-expanded pump and signal waves are spatially coupled. Spectrum components of both the pump and the signal waves linearly disperse in space rather than in temporal. Then, the 790 nm femtosecond pulsed laser and the 1030 nm femtosecond pulsed laser enter the periodically pole crystal 108 together. The 790 nm femtosecond pulsed laser is configured as a pump wave to perform the optical parametric amplification of 1030 nm femtosecond pulsed laser and a spatial-chirped 3.4 μm mid-infrared idler wave is obtained as well.

Actually, since the pump and the signal waves are both spatial-chirped with opposite chirp signs within the periodically poled crystal 108, to realize an efficient full-spectrum optical parametric amplification, relatively independent spectrum components of the pump and the signal waves in different transverse locations should all be phase matched. Therefore, a fan-out periodically poled lithium niobate crystal (PPLN) is configured as the periodically poled crystal 108. Since the transverse grating periods of a fan-out PPLN crystal can be designed arbitrarily as needed, the non-uniform phase-matching conditions required for different spectrum components at different transverse locations just can be realized via the transversely varying grating periods, and as a result, all spectrum components of the mid-infrared idler wave can be amplified effectively so as to obtain a high-power and ultrabroad idler wave. The hybrid waves outgoing from the periodically poled crystal 108 pass through the optical splitter 109. Then the amplified signal wave and the attenuated pump wave are separated and only the 3.4 μm mid-infrared idler wave is left. After its passing through the output collimator 110 and the output grating 111, a Fourier transform from frequency domain to temporal domain is performed. The dispersion compensator is configured to compensate for group velocity dispersion of the idler wave accumulated within the periodically poled crystal 108 and a 3.4 μm mid-infrared ultra-short pulsed laser is obtained.

Specifically, supposing pump and signal waves have equal spectral bandwidth, equal initial beam radius and equal spatial expansion, the generated idler spectral bandwidth will be twice of those of incident pump and signal waves. Correspondingly, the spatial chirp ($\partial x/\partial v$) on the focus plane gets only ½ of the original. Different from a conventional 4f optical system, the optical system adopted by the present invention is a "$2f_1$-$2f_2$" optical system. Apart from configuring gratings (or prisms) aiming at different laser wavelength, focal length of the collimators at input and output ends (i.e., $f_1$ and $f_2$) are relatively independent. Assuming the generated idle wave shares a same dispersion feature with incident pump and signal waves, if $f_1=f_2$, after the second half space transmission of "$2f_2$", the angular dispersion of idler wave gets approximately ½ of that provided by the input gratings when the idler wave incidences on the output grating.

It should be noted that, spectral bandwidth of the 3.4 μm idler wave strongly depends on grating period chirp rate of the PPLN crystal. Only adopting an appropriate grating period structure can the nonlinear processes of relatively independent but different spectrum components of the pump and the signal waves all satisfy perfect phase-matching, and therefore the broadest idler wave and the highest conversion efficiency can be achieved. The optimal grating period structure (i.e., the chirp rate of the transverse varying grating periods) is decided by initial pulse durations and spatial expansions (i.e., length-width ratio of the elliptical spot on the focus plane) of both the pump and the signal waves. This is because in a fixed spatial region, the spectral bandwidth of pump and signal waves decide the dispersion degree of their abundant spectrum components as well as overlapping relationship of the spectrum components. Obviously, for different overlapping relationships, the optimal chirp rate of the transverse varying grating periods is also distinct. Vice versa, for definite pump and signal waves, when the spatial expansion is altered, the optimal grating period chirp rate will be modified as well. This feature provides convenience for applications of the present invention because it loosens the precise design and fabrication of specified fan-out PPLN crystals. Furthermore, for a same nonlinear process but different initial pulse durations, based on a pre-existing fan-out PPLN crystal, different overlapping spectrum components can also just correspond to the required phase-matching grating periods via a suitable regulation of the spatial expansion, without unnecessary repeated designing for different fan-out PPLN crystals.

Figure 2A:
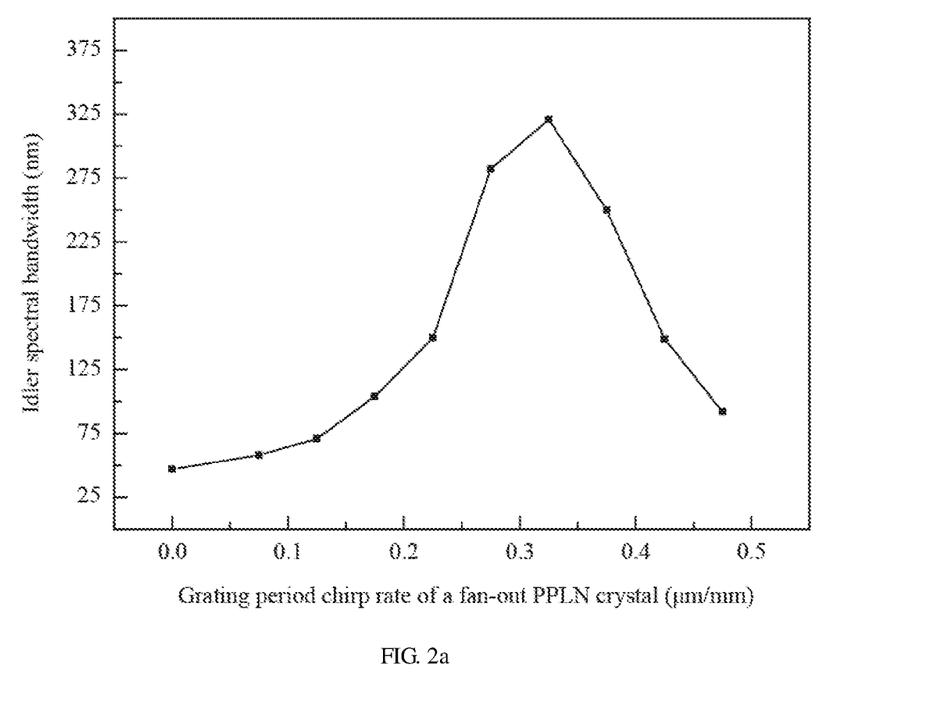
FIG. 2a is a schematic view showing idler spectral bandwidth varying with grating period chirp rate of a fan-out PPLN crystal (μm/mm) according to an embodiment of the present invention, when initial pulse durations of pump and signal waves are 35 fs and 100 fs respectively.
Figure 2B:
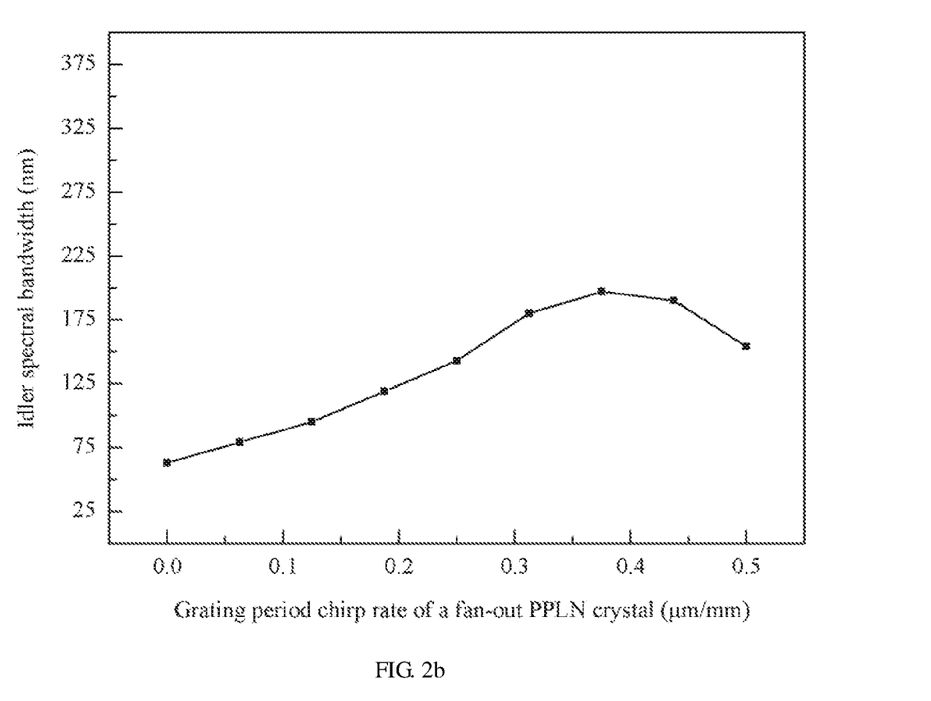
FIG. 2b is a schematic view showing idler spectral bandwidth varying with grating period chirp rate of a fan-out PPLN crystal (μm/mm) according to an embodiment of the present invention, when initial pulse durations of pump and signal waves are both 100 fs.

Further, based on a 5 mm fan-out PPLN crystal, we have conducted numerical simulations for gain characteristic of the presented optical parametric amplifier on conditions of initial pulse durations of the 790 nm pump wave and the 1030 nm signal wave are 35 fs and 100 fs, and 100 fs and 100 fs respectively, to verify the relationship between optimal chirp rate of the transverse varying grating periods and pulse durations, as shown in FIGS. 2a and 2b specifically. Based on the following assumptions: incident pump and signal waves have equal beam radius; after a spatially chirped expansion, length-width ratios of the elliptical spots are both 5:1 and the minor axes in non-expanded dimension are both 1 mm (half-width at $1/e^2$ maximum, i.e., the beam radius of a quasi-continuous laser with only partial spectrum components). Ignoring the influence of group velocity mismatch and assuming the interacting pump and signal waves at each focal point are both quasi-continuous. The central frequencies of pump and signal waves can always satisfy phase-matching in cross-section center of the fan-out PPLN crystal. The nonlinear crystal is a fan-out PPLN crystal whose grating period varies transversely along the frequency variation direction. The simulation results are presented as FIGS. 2a and 2b, showing idler spectral bandwidth varying with the grating period chirp rate of a fan-out PPLN crystal (μm/mm) for distinct initial pulse durations. It can be seen that idler waves of varying spectral bandwidth are generated for different grating period chirp rate. Only near the optimum value, the nonlinear processes of relatively independent spectrum components of the pump and the signal waves can always satisfy the perfect phase-matching and an idler wave of the broadest spectrum thus can be achieved. It's clear that for each duration case, the optimum chirp rate would be different as well.

Further, we also conducted numerical simulations on performance of the dual-chirped spectral optical parametric amplifier and made a comparison with that of a conventional femtosecond optical parametric amplifier. In the present invention, the pump and the signal waves possess an equivalent initial temporal duration of 100 fs. On the focus plane, the optical spots are both spatially expanded to 100 times larger in the transverse dimension and correspondently the pulse durations are stretched to 100 times of the original, i.e., 10 ps. To take advantage of the maximal nonlinear coefficient d33 of the PPLN crystal, Type-0 quasi-phase-matching is adopted and pump, signal and idler waves are all e-polarized. Assuming the major axes of the elliptical beam profiles along the transverse dimension is 50 mm, the minor one along the other dimension is 0.5 mm (half-width at $1/e^2$ maximum). The grating period in cross-section center of the configured fan-out PPLN crystal is 22 μm and the grating period chirp rate is ~0.01 μm/mm, that is grating periods of the fan-out PPLN crystal will vary ~0.01 μm per 1 mm along the transversely chirping direction. In practical applications, the damage threshold of picosecond pulsed lasers is significantly lower than that of the femtosecond pulsed lasers. Generally, the crystal damage threshold is inversely proportional to the square root of pulse duration. To get sufficient gain, a longer nonlinear crystal is required for the picosecond pulsed lasers. To reveal the performance of optical parametric amplifiers of different configurations closer to reality, pump intensity of the presented dual-chirped spectral optical parametric amplifier is 1/10 of that of the conventional femtosecond optical parametric amplifier. At the same time, the crystal length is increased by $10^{1/2}$ to ensure a comparable ideal conversion efficiency.

Figure 3A:
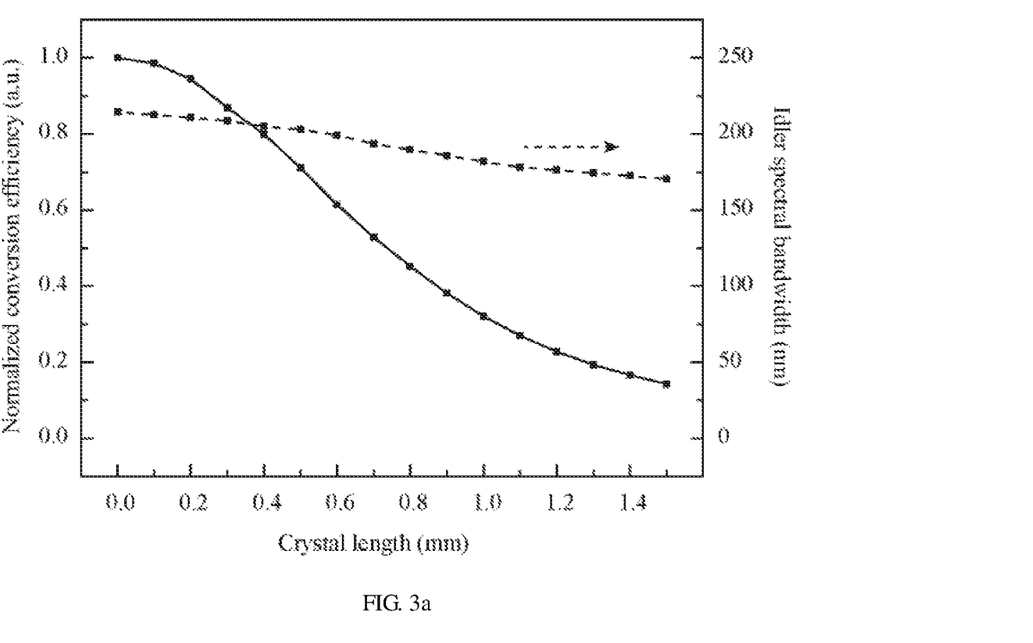
FIG. 3a is a schematic view showing a normalized conversion efficiency and idler spectral bandwidth of a conventional femtosecond optical parametric amplifier in the prior art varying with crystal length of a PPLN crystal with a uniform grating period.
Figure 3B:
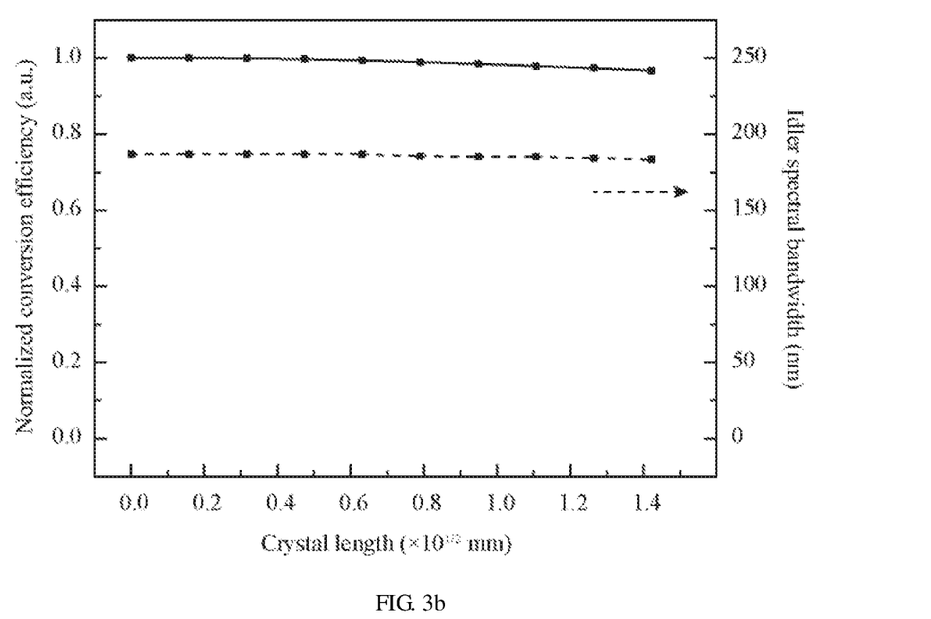
FIG. 3b is a schematic view showing a normalized conversion efficiency and idler spectral bandwidth of a dual-chirped spectral optical parametric amplifier according to an embodiment of the present invention varying with crystal length of a fan-out PPLN crystal.
Figure 3C:
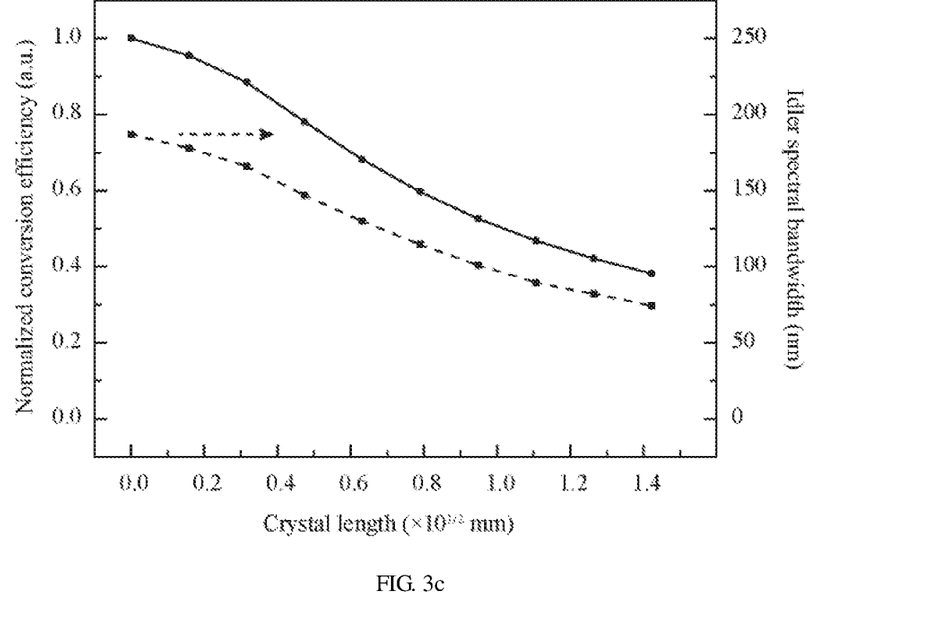
FIG. 3c is a schematic view showing a normalized conversion efficiency and idler spectral bandwidth of a dual-chirped spectral optical parametric amplifier according to an embodiment of the present invention varying with crystal length of a PPLN crystal with a uniform grating period.

FIGS. 3a and 3b show respectively the normalized small-signal conversion efficiency and idler spectral bandwidth of a conventional femtosecond optical parametric amplifier and the dual-chirped spectral optical parametric amplifier varying with crystal length. To any datapoint presented here, multiple of the square of pump intensity and the crystal length (i.e., $I^2L$) is constant, which means in an ideal condition (GVM=0), identical conversion efficiency and idler spectrum will be achieved. It can be seen that thanks to a frequency mixing effect, the idler spectrum obtained from the femtosecond optical parametric amplifier is significantly broader than the initial ones of the pump and the signal waves. Even though in lack of the frequency mixing effect in the femtosecond optical parametric amplifier, the dual-chirped spectral optical parametric amplifier is still able to overcome the gain narrowing resulting from the non-uniform gain spectrum, and obtains a significantly broadened idler output compared with the incident pump wave. As the crystal length increases, thanks to the frequency mixing effect, the idler spectral bandwidth is almost untouched with optimal performance, but due to the more prominent temporal walk-off among the interacting waves, conversion efficiency presents a remarkable decrease. In contrast, for the dual-chirped spectral optical parametric amplifier, both of the conversion efficiency and the idler spectral bandwidth always maintain an optimal performance. FIG. 3c also shows the results where a conventional PPLN crystal with a unique grating period is adopted instead. It can be seen that the stretched interacting waves significantly relieve the group velocity mismatch influence on effective interaction length. Compared with the femtosecond optical parametric amplifier, the deterioration of conversion efficiency with the increase of crystal length gets obviously slower. However, the gain bandwidth is still restricted from the group velocity mismatch, resulting in a synchronous dropping of the overall conversion efficiency and the idler spectral bandwidth.

The dual-chirped spectral optical parametric amplifier provided by the embodiment of the present invention skillfully solved the problem that broadband ultra-short pulsed lasers cannot be achieved directly due to the restriction of crystal damage and group velocity mismatch in conventional femtosecond optical parametric amplifiers and the limited gain bandwidth of a single-stage optical parametric chirp pulse amplifier. By means of a high-power pump source, the embodiment of the present invention is able to obtain a high-intensity ultra-short pulsed laser with a long wavelength directly (i.e., the generated idler wave).

Figure 4:
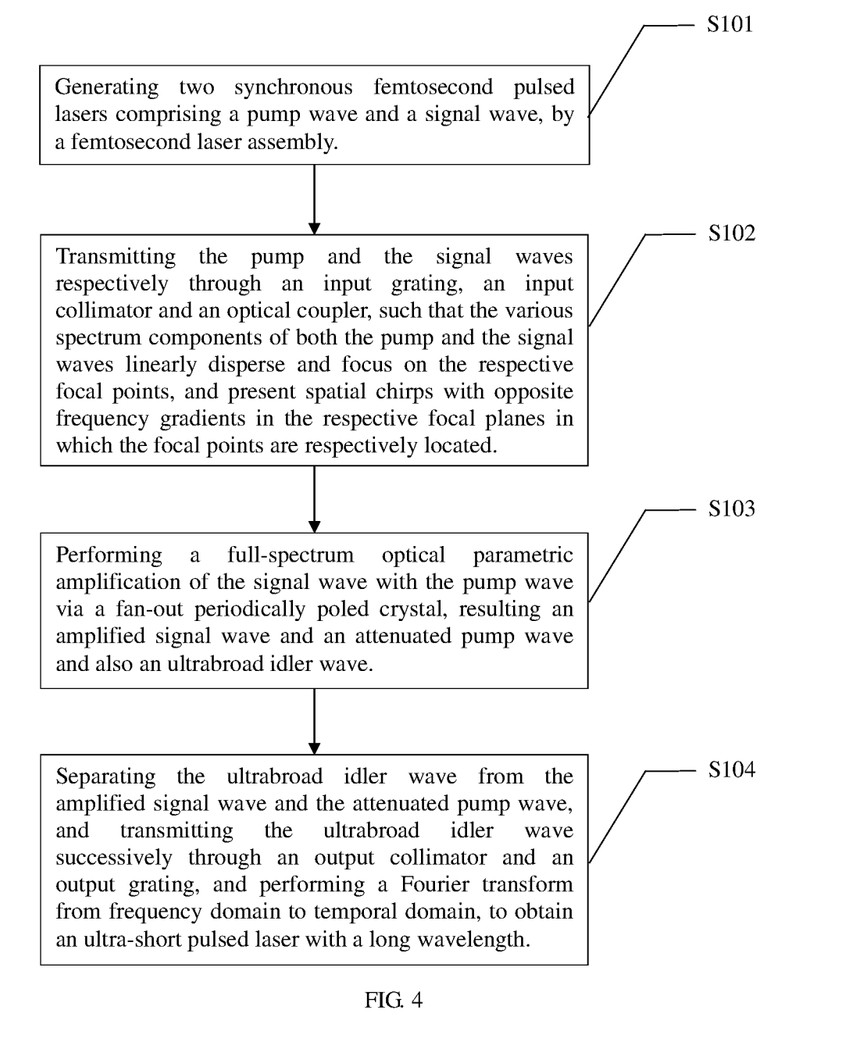
FIG. 4 is a flow diagram of a dual-chirped spectral optical parametric amplification method according to an embodiment of the present invention.

The present invention also provides a dual-chirped spectral optical parametric amplification method, as shown in FIG. 4, comprising:

Step S101, generating two synchronous femtosecond pulsed lasers comprising a pump wave and a signal wave, by a femtosecond laser assembly;

Specifically, the femtosecond laser assembly comprises a first femtosecond laser and a second femtosecond laser, and the pump wave outgoing from the first femtosecond laser and the signal wave outgoing from the second femtosecond laser are synchronous; or alternatively, the femtosecond laser assembly comprises a femtosecond laser and a frequency converter, and a femtosecond pulsed laser outgoing from the femtosecond laser passes through the frequency converter to generate two synchronous femtosecond pulsed lasers, one of which acting as the pump wave and the other of which acting as the signal wave;

Step S102, transmitting the pump and the signal waves respectively through an input grating, an input collimator and an optical coupler, such that the various spectrum components of both the pump and the signal waves linearly disperse and focus on the respective focal points, and present spatial chirps with opposite frequency gradients in the respective focal planes in which the focal points are respectively located;

Step S103, performing a full-spectrum optical parametric amplification of the signal wave with the pump wave via a fan-out periodically poled crystal, resulting an amplified signal wave and an attenuated pump wave and also an ultrabroad idler wave;

Specifically, the fan-out periodically poled crystals provided by the present invention is arranged on a focus plane, which serving as an energy conversion medium. Via appropriately designing grating periods of the fan-out periodically poled crystal which vary along frequency variation direction of the signal and pump waves, phase-matching grating periods required for their relatively independent spectrum components can just correspond to those of the fan-out periodically poled crystal, such that all spectrum components across the entire spectrum can satisfy the phase-matching condition;

Step S104, separating the ultrabroad idler wave from the amplified signal wave and the attenuated pump wave; and transmitting the ultrabroad idler wave successively through an output collimator and an output grating, and performing a Fourier transform from frequency domain to temporal domain, to obtain an ultra-short pulsed laser with a long wavelength;

Specifically, transmitting the ultrabroad idler wave successively through an output collimator and an output grating, and performing a Fourier transform from frequency domain to temporal domain, and compensating for accumulated group velocity dispersion of the idler wave outgoing from the output grating, to obtain an ultra-short pulsed laser with a long wavelength.

The dual-chirped spectral optical parametric amplification method provided by an embodiment of the present invention, by means of the added opposite spatial chirps to pump and signal waves, spectral bandwidth of the generated idler wave can be increased greatly. Besides, since various spectrum components of the pump and the signal waves linearly diverse on a focus plane, their pulse duration thus can be broadened proportionally so that the limitation of crystal damage and group velocity mismatch of conventional femtosecond optical parametric amplifiers can be relaxed. Then, a fan-out periodically poled crystal is configured as the nonlinear medium, to realize a broadband quasi-phase-matching. the embodiment of the present invention skillfully solved the problem that broadband ultra-short pulsed lasers cannot be achieved directly due to the restriction of crystal damage and group velocity mismatch in conventional femtosecond optical parametric amplifiers and the limited gain bandwidth of a single-stage optical parametric chirp pulse amplifier. By means of a high-power pump source, the embodiment of the present invention is able to obtain a high-intensity ultra-short pulsed laser with a long wavelength directly (i.e., the generated idler wave).

The above is only illustrative of preferred embodiments of the present invention, and not intended to limit the present invention. Any modifications, equivalent replacements and improvements made within the spirit and principle of the present invention should be included in a protection scope of the present invention.

What is claimed is:

1. A dual-chirped spectral optical parametric amplifier, comprising:
   a femtosecond laser assembly;
   a first input grating;
   a second input grating;
   a first input collimator;
   a second input collimator;
   an optical coupler;
   a fan-out periodically poled crystal;
   an optical splitter;
   an output collimator; and
   an output grating,
   wherein the fan-out periodically poled crystal, the optical splitter, the output collimator and the output grating are arranged sequentially in the direction of an optical path;
   the femtosecond laser assembly is configured to generate two synchronous femtosecond pulsed lasers, comprising a pump wave and a signal wave; the pump wave passes successively through the first input grating and the first input collimator, then enters the optical coupler; the signal wave passes successively through the second input grating and the second input collimator, then enters the optical coupler; the incident pump and signal waves are spatially coupled via the optical coupler; the various spectrum components of both the pump and the signal waves linearly disperse and focus on respective focal points, and present spatial chirps with opposite frequency gradients in the respective focal planes in which the focal points are respectively located;

the pump and the signal waves outgoing from the optical coupler enter the fan-out periodically poled crystal, wherein the fan-out periodically poled crystal serves as a nonlinear medium, to perform a full-spectrum optical parametric amplification of the signal wave with the pump wave, resulting an amplified signal wave and an attenuated pump wave and also an ultrabroad idler wave; the ultrabroad idler wave is separated from the amplified signal wave and the attenuated pump wave via the optical splitter; the separated idler wave passes successively through the output collimator and the output grating, and is Fourier transformed from frequency domain to temporal domain, to obtain a ultra-short pulsed laser with a long wavelength;

wherein phase-matching grating periods required for each independent spectrum components of the pump and the signal waves just correspond to those of the fan-out periodically poled crystal, such that all spectrum components across the entire spectrum can satisfy the phase-matching condition.

2. The dual-chirped spectral optical parametric amplifier according to claim 1, wherein the femtosecond laser assembly comprises a first femtosecond laser and a second femtosecond laser, and the pump wave outgoing from the first femtosecond laser and the signal wave outgoing from the second femtosecond laser are synchronous;

or alternatively, the femtosecond laser assembly comprises a femtosecond laser and a frequency converter, and a femtosecond pulsed laser outgoing from the femtosecond laser passes through the frequency converter to generate two synchronous femtosecond pulsed lasers, one of which acting as the pump wave and the other of which acting as the signal wave.

3. The dual-chirped spectral optical parametric amplifier according to claim 2, wherein the first femtosecond laser is a 790 nm Ti:Sapphire femtosecond laser which outputs a 790 nm pump wave, and the second femtosecond laser is a 1030 nm femtosecond laser, which outputs a 1030 nm signal wave.

4. The dual-chirped spectral optical parametric amplifier according to claim 1, further comprising:

a dispersion compensator, wherein the dispersion compensator is arranged between the output grating and an output terminal of the dual-chirped spectral optical parametric amplifier, to compensate for accumulated group velocity dispersion of the idler wave outgoing from the output grating.

5. The dual-chirped spectral optical parametric amplifier according to claim 1, wherein the optical splitter is a dichroic mirror with high transmittance to the signal and the pump waves and with high reflectivity to the idler wave;

or alternatively, the optical splitter is a dichroic mirror with high transmittance to the idler wave and with high reflectivity to the signal and the pump waves.

6. The dual-chirped spectral optical parametric amplification method based on the dual-chirped spectral optical parametric amplifier according to claim 1, comprising:

generating two synchronous femtosecond pulsed lasers comprising a pump wave and a signal wave, by a femtosecond laser assembly;

transmitting the pump and the signal waves respectively through an input grating, an input collimator and an optical coupler, such that the various spectrum components of both the pump and the signal waves linearly disperse and focus on the respective focal points, and present spatial chirps with opposite frequency gradients in the respective focal planes in which the focal points are respectively located;

performing a full-spectrum optical parametric amplification of the signal wave with the pump wave via a fan-out periodically poled crystal, resulting an amplified signal wave and an attenuated pump wave and also an ultrabroad idler wave;

separating the ultrabroad idler wave from the amplified signal wave and the attenuated pump wave; and transmitting the ultrabroad idler wave successively through an output collimator and an output grating, and performing a Fourier transform from frequency domain to temporal domain, to obtain an ultra-short pulsed laser with a long wavelength.

7. The dual-chirped spectral optical parametric amplification method according to claim 6, wherein phase-matching grating periods required for each independent spectrum components of the pump and the signal waves just correspond to those of the fan-out periodically poled crystal, such that all spectrum components across the entire spectrum can satisfy the phase-matching condition.

8. The dual-chirped spectral optical parametric amplification method according to claim 6, wherein the femtosecond laser assembly comprises a first femtosecond laser and a second femtosecond laser, and the pump wave outgoing from the first femtosecond laser and the signal wave outgoing from the second femtosecond laser are synchronous;

or alternatively, the femtosecond laser assembly comprises a femtosecond laser and a frequency converter, and a femtosecond pulsed laser outgoing from the femtosecond laser passes through the frequency converter to generate two synchronous femtosecond pulsed lasers, one of which acting as the pump wave and the other of which acting as the signal wave.

9. The dual-chirped spectral optical parametric amplification method according to claim 8, wherein the first femtosecond laser is a 790 nm Ti:Sapphire femtosecond laser which outputs a 790 nm pump wave; and the second femtosecond laser is a 1030 nm femtosecond laser which outputs a 1030 nm signal wave.

10. The dual-chirped spectral optical parametric amplification method according to claim 8, wherein transmitting the ultrabroad idler wave successively through an output collimator and an output grating, and performing a Fourier transform from frequency domain to temporal domain, to obtain an ultra-short pulsed laser with a long wavelength comprising:

transmitting the ultrabroad idler wave successively through an output collimator and an output grating, and performing a Fourier transform from frequency domain to temporal domain, and compensating for accumulated group velocity dispersion of the idler wave outgoing from the output grating, to obtain an ultra-short pulsed laser with a long wavelength.

* * * * *